(12) United States Patent
Peters et al.

(10) Patent No.: US 8,103,172 B2
(45) Date of Patent: Jan. 24, 2012

(54) DISTRIBUTABLE QUANTUM RELAY ARCHITECTURE

(75) Inventors: Nicholas A. Peters, Laurel, MD (US); Thomas E. Chapuran, Hillsborough, NJ (US); Robert Runser, Clarksville, MD (US); Matthew S. Goodman, Ellicott City, MD (US)

(73) Assignee: Telcordia Technologies, Inc., Piscataway, NJ (US)

( * ) Notice: Subject to any disclaimer, the term of this patent is extended or adjusted under 35 U.S.C. 154(b) by 397 days.

(21) Appl. No.: 12/487,879

(22) Filed: Jun. 19, 2009

(65) Prior Publication Data

US 2009/0317089 A1 Dec. 24, 2009

Related U.S. Application Data

(60) Provisional application No. 61/074,194, filed on Jun. 20, 2008.

(51) Int. Cl.
*H04B 10/02* (2006.01)
(52) U.S. Cl. ........................ 398/173; 398/140; 398/175
(58) Field of Classification Search .................. 398/130, 398/140–141, 173–175
See application file for complete search history.

(56) References Cited

U.S. PATENT DOCUMENTS

| | | | |
|---|---|---|---|
| 6,643,047 B2 | 11/2003 | Bhat et al. | |
| 6,762,844 B2 | 7/2004 | Dress et al. | |
| 7,220,954 B2 * | 5/2007 | Kuzmich et al. | 250/214.1 |
| 2004/0078421 A1 | 4/2004 | Routt | |
| 2005/0059138 A1 | 3/2005 | Vitaliano et al. | |
| 2005/0100351 A1 * | 5/2005 | Yuan et al. | 398/214 |
| 2006/0002563 A1 | 1/2006 | Bussieres et al. | |
| 2006/0115086 A1 * | 6/2006 | Beausoleil et al. | 380/263 |
| 2007/0098174 A1 | 5/2007 | Trifonov et al. | |
| 2008/0089696 A1 | 4/2008 | Furuta | |
| 2008/0142787 A1 | 6/2008 | Loss | |
| 2008/0212186 A1 | 9/2008 | Zoller et al. | |
| 2008/0258049 A1 | 10/2008 | Kuzmich | |
| 2009/0022322 A1 | 1/2009 | Trifonov | |
| 2009/0034575 A1 | 2/2009 | Wang et al. | |
| 2009/0097862 A1 * | 4/2009 | Munro et al. | 398/175 |
| 2009/0180776 A1 * | 7/2009 | Brodsky et al. | 398/51 |
| 2010/0278373 A1 * | 11/2010 | Capron et al. | 382/100 |

OTHER PUBLICATIONS

International Search Report dated Sep. 29, 2009.
Tao Yang, et al., "Experimental Synchronization of Independent Entangled Photon Sources," Phys. Rev. Lett. 96, 110501 2006.
Rainer Kaltenbaek, et al., "Experimental Interferance of Independent Photons," Phys. Rev. Lett. 96, 240502 2006.
Rainer Kaltenbaek, et al., "High-fidelity entanglement swapping with fully independent sources," Phys. Rev. A 79, 040302(R) 2009.
Christian Schmid, et al., "Quantum teleportation and entanglement swapping with linear optics logic gates," New Journal of Physics, 11 033008 2009.

* cited by examiner

*Primary Examiner* — Dzung Tran
(74) *Attorney, Agent, or Firm* — Philip J. Feig

(57) ABSTRACT

A distributed quantum relay architecture is disclosed. In one embodiment of this architecture, time and wavelength division multiplexing are used to enable a laser pump pulse, already used to create an initial entangled photon pair, to be distributed to a remote relay site, on the same optical fiber as a photon from that initial pair. At that remote site, the pump pulse is amplified and used to locally create the second entangled photon pair that is required for quantum teleportation. This embodiment enables the placement of quantum repeater stations at remote locations without complicated dedicated channels to distribute the pump or electronics. In addition, as lasers are generally among the most expensive components, a significant cost savings is gained, in this embodiment, by using only one pump laser instead of two (or more) as in previous quantum teleportation efforts.

20 Claims, 2 Drawing Sheets

No incoming photon, first single photon is created from first pair and initialized using the state preparation device.

DISTRIBUTABLE QUANTUM RELAY ARCHITECTURE

CROSS-REFERENCE TO RELATED APPLICATION

This application claims the benefit of provisional application No. 61/074,194, filed Jun. 20, 2008, the disclosure of which is herein incorporated by reference in its entirety.

FIELD OF THE INVENTION

The present invention generally relates to quantum teleportation, and more specifically, to an architecture enabling the use of widely distributed quantum relay or repeater stations along a fiber communications link.

BACKGROUND OF THE INVENTION

Quantum teleportation, which utilizes entanglement, is a critical technique for enabling quantum relays and quantum repeaters. In quantum teleportation an incoming qubit (e.g., a single photon), typically in an unknown quantum state, is combined with one half of a two-qubit (e.g., two-photon) entangled pair, and a Bell-state measurement is performed. The result of this measurement is then fed forward to apply an appropriate unitary transformation to the third qubit (that was originally part of the entangled pair). Upon application, the unitary transformation sets the third (outgoing) qubit's state to that of the unknown (incoming) qubit.

However, to maximize and extend the reach, additional teleportations must be made, each of which requires the creation of another entangled pair. In the case of an optical fiber link or optical fiber network, photons are normally used as qubits for transmission of a quantum state between distant locations. Two-photon entangled pairs at quantum relay or quantum repeater sites can be used to enable teleportation. This technique can relay the unknown state of an initial photonic qubit farther along a fiber or fiber network than would be feasible by simply transmitting the original qubit over the fiber or fiber network. In addition, this architecture may be used to swap entanglement if the first qubit is entangled with an additional qubit. To maximize the distance between relay or repeater stages, additional entangled-photon pairs must be created at widely separated locations.

To avoid degrading the quality of the transmission of information, it is desirable that the entangled photon pair generated at a given relay or repeater is indistinguishable from the entangled photon pair generated at the previous relay or repeater site. One approach to enhance the indistinguishability is to use the same laser pump to create both pairs. However, because most implementations utilize an ultrashort laser pump to create entangled photons, this approach normally requires the two pairs to be created in close spatial proximity, e.g., on the same optical table, which does not easily lend itself to practical application in realistic networks.

While not at wavelengths suitable for long-distance fiber transmission, there have been two recent proof-of-principle experiments that attempt to address the issue by locking laser pulses from two independent lasers (which could in principle be separated). The first approach used a nonlinear Kerr medium for optical pulse locking. This approach is described in "Experimental Synchronization of Independent Entangled Photon Sources," by Tao Yang, Qiang Zhang, Teng-Yun Chen, Shan Lu, Juan Yin, Jian-Wei Pan, Zhi-Yi Wei, Jing-Rong Tian, and Jie Zhang, Phys. Rev. Lett. 96, 110501 (2006). The second approach used electronic synchronization of two lasers themselves. This approach is described in "Experimental Interference of Independent Photons," by Rainer Kaltenbaek, Bibiane Blauensteiner, Marek Zukowski, Markus Aspelmeyer, and Anton Zeilinger, Phys. Rev. Lett. 96, 240502 (2006) and in "High-fidelity entanglement swapping with fully independent sources," by Rainer Kaltenbaek, Robert Prevedel, Markus Aspelmeyer, Anton Zeilinger, Phys. Rev. A 79, 040302(R) (2009). In principle, these approaches would allow lasers in different locations to be used to generate the required entangled photon pairs.

In addition, there has been an attempted solution at telecom wavelengths which uses a special measurement technique and continuous wave (CW) laser pumps, to avoid the need to use the same pulsed pump laser, described in, "Entangling Independent Photons by Time Measurement," by Matthaus Halder, Alexios Beveratos, Nicolas Gisin, Valerio Scarani, Christoph Simon and Hugo Zbinden, Nature Physics, Vol. 3, 692 (2007).

While interesting, these prior art approaches have a number of shortcomings. For example, the Kerr locking solution requires the pumps from the distant sources to be brought together in one place, locked, and then redistributed to create photons in the two separate locations. The electronically locked solution requires electronic feedback channels to be maintained over long distances. Such a solution fails when the fluctuations that are to be stabilized occur on a time scale comparable to the time it takes for information to travel from distant stations. The CW pump/measurement solution uses exotic low-jitter detectors and very narrow frequency filters to increase the coherence length of the photons, necessarily rejecting most of the resource photon pairs.

SUMMARY OF THE INVENTION

An object of this invention is to enable the use of widely distributed quantum relay or repeater stations along a fiber communications link or within a fiber communications network.

Another object of the invention is to use a single laser pump pulse to create a respective entangled photon pair at each of two or more sites in a distributed quantum relay architecture.

A further object of the present invention is to use time and wavelength division multiplexing, in a distributed quantum relay architecture, to enable a laser pump pulse, used to create an initial entangled photon pair, to be distributed to a remote relay site and used at that site to create a second entangled photon pair.

These and other objectives are attained with a distributed quantum relay architecture and a method of operating a distributed quantum relay architecture. This distributed quantum relay architecture, in one embodiment, includes a first station and a plurality of relay stations. The first station includes a photon pair source for using a laser signal to generate a first pair of entangled photons, and a state measurement device for measuring a state of a first photon of this first pair of photons. This first station directs a second photon of the first pair of photons and a portion of the laser signal to one of the relay stations with a defined relationship between said second photon and said portion of the laser signal.

This relay station includes an input for receiving this second photon and this second portion of the laser signal, and for using the above-mentioned defined relationship to distinguish between this second photon and this portion of the laser signal. This relay station also includes a photon pair source for using the portion of the laser signal to generate a second pair of entangled photons. The combined state of the second photon of the first pair of photons and a first photon of the second pair of photons is used to prepare the state of a second photon of said second pair of photons. The relay station may then direct the second photon of the second pair, along with a residual portion of the laser signal, to another relay station.

In one embodiment, in the first station, the pump laser is injected into nonlinear media to generate the first pair of entangled photons. One photon is detected and used to herald the presence of the second photon in the pair, whose quantum state is set by the configuration of a state preparation device through which the second photon passes. (The state preparation device could be, for example, a polarizer followed by a polarization controller for a polarization-encoded qubit). This first station directs the second photon of the first pair of photons and a portion of the pump laser signal to one of the relay stations, with a defined relationship between said second photon and said portion of the laser signal. In this embodiment, said portion of the laser pump signal is the residual pump signal remaining after transmission through the nonlinear media and wavelength filtering.

In this embodiment, this relay station also includes optical elements for using the portion of the laser signal to generate the second pair of entangled photons, and a Bell State Analysis device for measuring the combined state of the second photon of the first pair of photons and the first photon of the second pair of photons. The results of this state measurement are fed forward to a state controlling device to control the state of the second photon of said second pair of photons, as prescribed in the quantum teleportation protocol. The relay station may then direct the second photon of the second pair, along with the residual pump signal remaining after transmission through the nonlinear media and wavelength filtering in the relay station, to another relay station.

The preferred embodiment of the invention, described in detail below, uses time and wavelength division multiplexing to enable the residual portion of a laser pump pulse, already used to create an initial entangled photon pair, to be distributed to a remote relay site, on the same optical fiber as a photon from that initial pair. At that remote site, the pump pulse can be amplified, attenuated and frequency filtered and used to locally create the second entangled photon pair that is required for quantum teleportation. Distribution of the pump pulse from the first station to the successive relay stations can increase indistinguishability of the photon pairs used for teleportation at the relays from the initial photon whose quantum state is being teleported.

The preferred embodiment of this invention uses wavelength division multiplexing of the entangled photon pairs to reduce background noise from the pump and the pump's amplifiers. Thus in this embodiment, each pair of entangled photons will have one photon with a shorter wavelength ($\lambda s$) than the pump and one photon with a longer wavelength ($\lambda l$) than the pump. The photons that are used in the Bell State Analysis must be of the same wavelength, therefore, the wavelength of the first photon and second photon of each pair will be swapped in successive relay stages. For example, if the first node creates pairs where the first photon of the first pair has wavelength $\lambda s$ and the second photon of the first pair has $\lambda l$, then at the next stage, the first photon of the second pair shall be created with wavelength $\lambda l$, so the Bell State Analysis may be properly made. Then the second photon of the second pair will be created at $\lambda s$. Thus at the third repeater station the first photon of the third pair will be created with wavelength $\lambda s$ and so on swapping wavelengths at each station. Entangled photon pairs with identical wavelengths can also be employed, although in some cases this would make separation of the generated photon pairs from the pump more difficult.

Further benefits and advantages of this invention will become apparent from a consideration of the following detailed description, given with reference to the accompanying drawings, which specify and show preferred embodiments of the invention.

DETAILED DESCRIPTION OF THE PREFERRED EMBODIMENTS

The present invention, in one embodiment, provides a distributed quantum relay architecture in which time and wavelength division multiplexing enables a laser pump pulse, already used to create an initial entangled photon pair, to be distributed to a remote relay site, on the same optical fiber as a photon from that initial pair. At that remote site, the pump pulse is amplified as needed and used to locally create the second entangled photon pair that is required for quantum teleportation.

Figure 1:
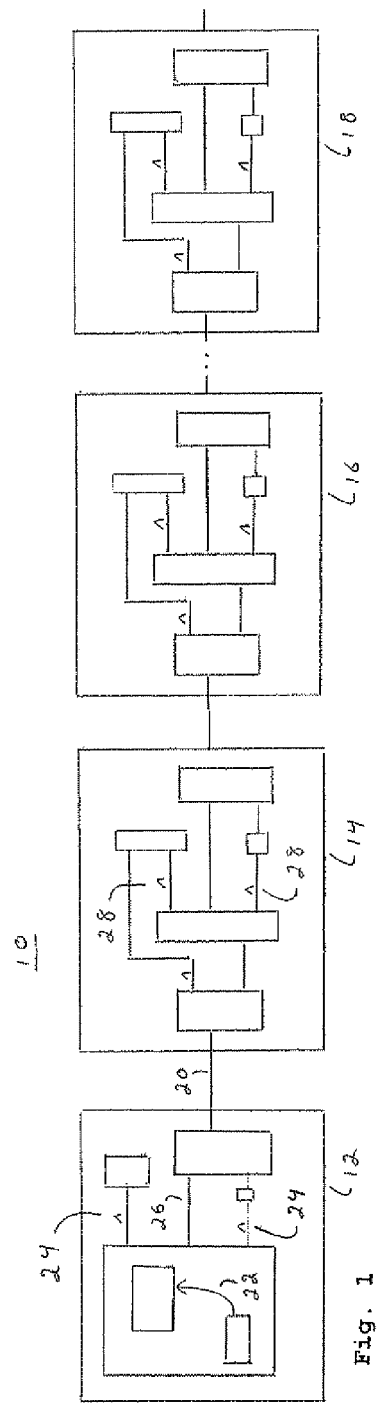
FIG. 1 generally illustrates a distributed quantum relay architecture embodying the present invention.

FIG. 1 shows an architecture 10 in accordance with an embodiment of the invention. This architecture includes a multitude of stations 12, 14, 16, 18, connected together in series by optical fiber 20. This multitude of stations includes a first station 12, and a plurality of relay stations 14, 16, 18.

Generally, in architecture 10, first station 12 is provided for using a laser signal 22 to generate a first pair of entangled photons, represented at 24, and for measuring a state of a first photon of that first pair of photons. Station 12 outputs a second photon of that first pair of photons and a portion 26 of the above-mentioned laser signal, with a defined relationship between that second photon and this portion of the laser signal.

Station 14 receives this second photon and this portion of the laser signal output from first station 12, and station 14 uses the above-mentioned defined relationship to distinguish between the second photon and the portion of the laser signal. Station 14 then uses this portion of the laser signal represented at 26, to generate a second pair of entangled photons, and performs a Bell State Analysis on the combined state of the second photon of the first pair of photons 24 and a first photon of the second pair of photons 28. The results of this state measurement are fed forward to a state controlling device to control the state of the second photon of said second pair of photons, as prescribed in the quantum teleportation protocol. Second station 14 can then output the second photon of this second pair of photons, along with a residual portion of the laser signal to station 16. This teleportation process can continue in this way until reaching the photon destination.

Figure 2:
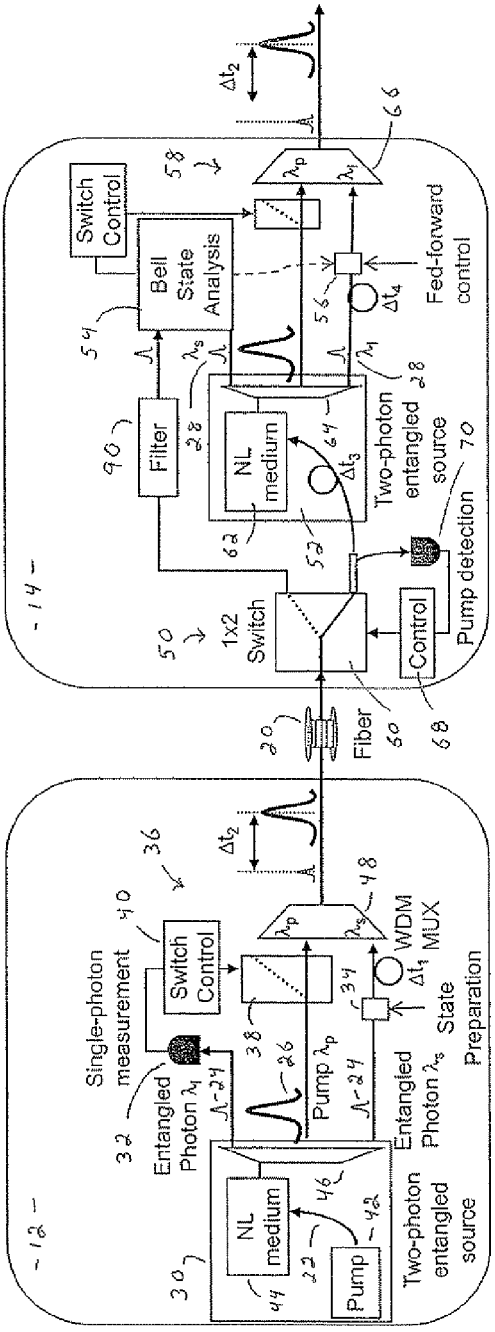
FIG. 2 is a more detailed view of two of the stations of the architecture of FIG. 1.

FIG. 2 shows in more detail stations 12 and 14. With the embodiment showing in this Figure, station 12 includes a photon pair source 30, a single-photon measurement device 32, state preparation device 34, and an output 36. This embodiment of station 12 also includes switch 38 and switch control 40. Photon pair source 30 includes laser 42, medium 44, and de-multiplexer 46, and output 36 includes multiplexer 48. Station 14 includes input 50, photon pair source 52, Bell state measurement device 54, state controlling device 56, and output 58. Input 50 includes switch 60, photon pair source 52 includes medium 62 and de-multiplexer 64, and output 58 includes multiplexer 66. Also, in the embodiment shown in FIG. 2, station 14 includes control 68 and pump detector 70.

Figure 3:
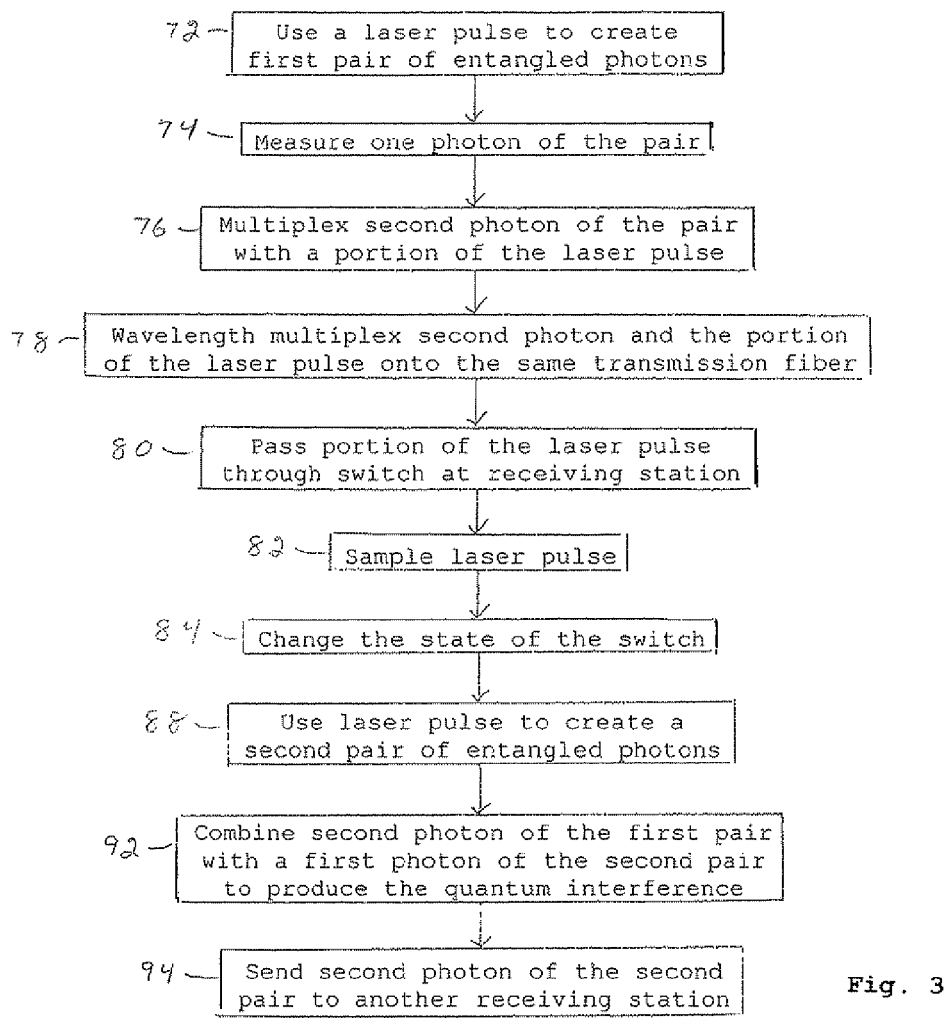
FIG. 3 is a flow chart showing one embodiment of the operation of the distributed architecture of FIG. 1.

In one embodiment of the operation of architecture 10, with reference to FIGS. 2 and 3, starting from station 12, at step 72, pump laser 22 is injected into nonlinear media 44 to generate the first pair of entangled photons 24. At step 74, one of the entangled photons is detected and used to herald the presence of the second photon in the pair, whose quantum state is set by the configuration of the state preparation device 34 through which the second photon passes. (The state preparation device could be, for example, a polarizer followed by a polarization controller for a polarization-encoded qubit). At step 76, this second photon is time multiplexed (via a delay $\Delta t1$) with the remainder 26 of the original pump pulse. In this embodiment, this remainder of the laser pump signal is the residual pump signal remaining after transmission through the nonlinear media 44 and wavelength filtering. The photon and the remaining pump pulse are then, at step 78, wavelength multiplexed onto the same transmission fiber 20. The photon and the pump pulse pass through fiber 20 with a time difference of $\Delta t2$ between the photon and the pump pulse.

After transmission to remote quantum relay element 14, the laser pump arrives first, and, at step 80, passes through the lower arm of 1×2 switch 60. At step 82, a small portion of the laser signal is split off, sampled at 70, and used to herald the anticipated arrival of the single photon. (Not all laser pulses will be directly followed by a single photon, due for example to loss in the fiber.) At step 84, the resulting control signal from control 68 flips the switch 58 for a short time interval, causing the single photon to travel through the upper arm of the switch, spatially demultiplexing the photon from the pump laser signal. A delay $\Delta t3$, in the pump path is used to synchronize the arrival at the Bell State Analyzer 54 of the incoming single photon and the first photon of the entangled pair which is to be created in element 14.

The pump laser is used, at step 88, to create another entangled photon pair 28. The single photon from station 12 is filtered at 90 to reduce noise, and then, at step 92, combined with one member of the newly created entangled photon pair 28 in a Bell State Analyzer 54, producing the quantum interference required for teleportation. Bell State Analyzer 54 measures the combined state of the second photon of the first pair of photons and a first photon of the second pair of photons. The results of this state measurement are fed forward to the state controlling device 56 to control the state of the second photon of said second pair of photons, as prescribed in the quantum teleportation protocol. A time delay $\Delta t4$ is introduced into the path of this second photon to time multiplex this photon with the residual laser pump signal. The pattern now repeats, as, at step 94, a portion of the pump pulse and the remaining single photon are time- and wavelength-multiplexed onto a fiber for transmission to the next teleportation/relay/repeater station along the line.

The above-described embodiment of the invention multiplexes the laser pump signal and the single-photonic qubit onto a single fiber for transmission to a remote relay site. In this way, the two entangled-photon pairs 24, 28 do not have to be created in close proximity, nor do optical signals need to be brought to a central site for processing and then redistributed over a distance.

By multiplexing and distributing the pump and single photon over the same fiber, this embodiment of the invention is self synchronizing, i.e., the presence of the bright pump heralds the anticipated arrival of the single photon). Differences in pump and single photon transmission times through the fiber, due to chromatic dispersion, can be compensated if necessary using standard methods for individual fiber links. Alternatively, they can be compensated by adjustment of the delays $\Delta t3$ and $\Delta t4$ in individual relay stations. This self-synchronization is in contrast to previous schemes in which external synchronization over long distances would be required. In addition, this embodiment of the invention requires only conventional InGaAs single-photon detectors, while maintaining compatibility with more exotic detectors, such as superconducting devices.

The wavelength and the spectral and temporal shapes of the pump pulse can be chosen to optimize transmission over conventional telecom fiber links. For example, the invention may be implemented using longer pump pulses than normally utilized in entangled-photon sources.

The laser pump signal, when received at station 14, heralds the arrival of the qubit, activating the single-photon detector gates, and also serving as a local pump pulse to create an entangled pair for quantum teleportation. The time delays $\Delta t1$ are chosen such that the photons taking part in the Bell State Analysis arrive at the same time and $\Delta t2$ remains constant for each transmission stage. The use of the switch 58 at station 14 that is triggered by the bright pump pulse enables detector gating for the Bell State Analysis to reduce the probability of errors.

As will be understood by those of ordinary skill in the art, a wide range of specific devices may be used in the implementation of the present invention. Any suitable laser source, Bell State Analysis devices, multiplexers, laser pump driven entangled source and demultiplexers may be used.

Several other embodiments of the invention are described in the following, by identifying alternatives to the above-discussed embodiment. Additional embodiments can also be defined via combinations of these alternative approaches.

In another embodiment of the invention, the output of the pump laser can (at some or all stations) be split into two pulses (e.g., using a power splitter), with the first pulse directed through nonlinear media to create an entangled photon pair, and the second pulse delayed and wavelength multiplexed with the second photon of the newly created entangled pair. The second pump pulse precedes said second photon of the entangled pair on the transmission link by a time $\Delta t_2$. This provides for a laser pump pulse that is unperturbed by the nonlinear media for distribution to the following station. This may require a higher power signal output from the laser pump, or amplification of the laser output or of the portion of the output which is used to locally generate an entangled photon pair.

An additional embodiment utilizes an optional switch 38 shown in the first station 12 that is controlled by switch control 40 to pass the residual portion 26 of the laser pump pulse on to the following relay station 14 only when the presence of the second photon of the pair 24 created at the first station has been heralded by detection of its sister photon. This switch 38 prevents additional stages from being triggered if the first photon of the initial pair 24 was not detected, thereby eliminating the possibility of noise at the detectors (whether from the detector's intrinsic characteristics or external to it) of the next stage being mistaken for a real signal when no signal had been created. A switch and control similar to 38 and 40, respectively, may be placed in an analogous location of the quantum relay elements but triggered on the successful completion of the Bell State Analysis 54. This switch prevents additional stages from being triggered if the Bell State Analysis is unsuccessful, thereby eliminating the possibility of noise at the detectors of the next stage being mistaken for a real signal.

In another embodiment of the invention, this architecture enables entanglement swapping when the first qubit is entangled with an additional qubit. In entanglement swapping, there are two methods of acquiring the initial entangled qubit. The first method uses an entangled qubit from another user, such as a quantum key distribution system or a quantum computer network. The second method creates the pair locally at the first station that contains the laser pump. In the latter case, the first photon of the first pair may be transmitted directly to a user who desires to share entanglement with a distant user at the end of the relay chain instead of being detected and used to control the switch 38 shown in the figure, which would be omitted or configured to transmit the pump to the next relay station.

In the case where the initial station starts with entangled pairs and it is desired to prepare and relay a specific quantum state, one can use Remote State Preparation and feed forward to prepare the state of the transmitted qubit. In this case the first photon is measured, projecting it into a complete pure state basis, and the result of the measurement is fed-forward to a state transformation device which performs the required unitary transformation on the second photon. One could measure the first photon, for example, if the photons are in a polarization entangled state, in the horizontal (H)/vertical (V) polarization basis, and feed forward the result to a polarization controller to apply the correct unitary transformation to produce the desired initial state depending on whether H or V was measured.

An embodiment of the invention, described above, enables the placement of quantum repeater stations at remote locations without complicated dedicated channels to distribute the pump or electronics. In addition, as lasers are generally among the most expensive components, a significant cost savings is gained, in this embodiment of the invention, by using only one pump laser instead of two (or more) as in previous quantum teleportation efforts. The use of only one laser may also reduce power consumption of quantum relays.

Figure 4:
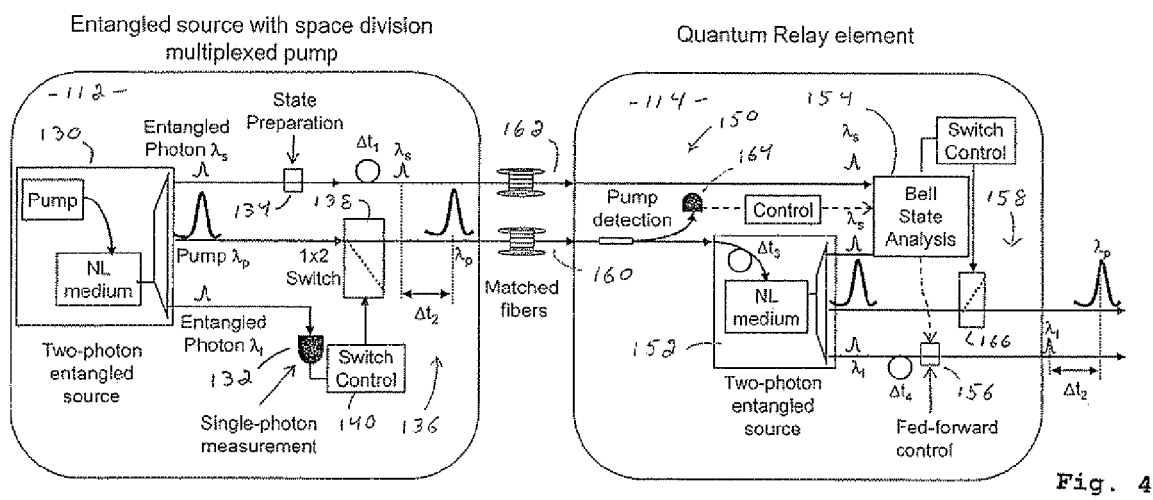
FIG. 4 illustrates alternate stations that may be used in the architecture of FIG. 1.

In another embodiment of the invention, as illustrated in FIG. 4, space division multiplexing (SDM) is used instead of wavelength division multiplexing, as shown in FIG. 2. FIG. 4 shows stations 112 and 114. Station 112 includes photon pair source 130, a single-photon measurement device 132, state preparations device 134, and an output 136. This embodiment of station 112 also includes switch 138 and switch control 140. Station 114 includes input 150, photon pair source 152, Bell State measurement device 154, state controlling device 156, and output 158.

In the embodiment of FIG. 4, using SDM, the pump and the single photon are transmitted between each pair of stations via two separate fibers 160, 162. Synchronization between the pump and the single photon at the receiving station requires additional effort relative to the WDM solution. This can for example be accomplished by matching the optical path length of the two fibers on each link, or compensating for differing path lengths on each link with additional fiber or other optical delay elements at the receiving station. Although SDM doubles the amount of transmission fiber required, this technique has the benefit of eliminating crosstalk from the pump signal into the single photon channel, as well as eliminating transmission impairments (such as reflected pump light, Raman scattering or four wave mixing) created during fiber transmission of a co-propagating pump. In this embodiment, the detection of the pump pulse, at detector 164, activates the Bell State Analyzer 154 such that it is only on when a single photon is expected. This reduces the likelihood of noise triggering the Bell State Analyzer. A switch 166 at the end of relay station 114 blocks the transmission of the pump pulse if the Bell State Analysis was unsuccessful, thereby preventing the triggering of additional stages when the earlier stage was unsuccessful.

While it is apparent that the invention herein disclosed is well calculated to fulfill the objects stated above, it will be appreciated that numerous modifications and embodiments may be devised by those skilled in the art and it is intended that the appended claims cover all such modifications and embodiments as fall within the true spirit and scope of the present invention.

What is claimed is:

1. A distributed quantum relay architecture comprising a series of quantum teleportation stations including a first station and a plurality of relay stations, said first station including:
   a first photon pair source for using a laser signal to generate a first pair of entangled photons,
   a first state measurement device for measuring a state of a first photon of said first pair of photons, and
   an output for directing a second photon of said first pair of photons and a portion of the laser signal to one of said relay stations with a defined relationship between said second photon and said portion of the laser signal; and
   said one of said relay stations including:
   an input for receiving said second photon and said portion of the laser signal, and for using said defined relationship to distinguish between said second photon and said portion of the laser signal,
   a second photon pair source for using said portion of the laser signal to generate a second pair of entangled photons, said second pair of entangled photons including a first photon and a second photon,
   a state controlling device for receiving the second photon of the second pair of photons, and for controlling the state of the second photon of the second pair of photons based on the combined state of the second photon of the first pair of photons and the first photon of the second pair of photons, and
   an output for directing said second photon of said second pair of photons to another one of said relay stations.

2. The distributed quantum relay architecture according to claim 1, wherein:
   said laser signal is split into first and second pulses;
   the first pulse of the laser signal is used to generate said first pair of photons; and
   the second pulse of the laser signal is used to form said portion of the laser signal that is directed to said one of the relay stations.

3. The distributed quantum relay architecture according to claim 1, wherein:
   the laser signal is transmitted through a media to generate the first pair of photons; and
   the remainder of the laser signal after transmission through said media is used to form said portion of the laser signal that is directed to said one of the relay stations.

4. The distributed quantum relay architecture according to claim 1, wherein the first station further includes a switch to prevent additional stations from being triggered if the first photon of the first pair of photons is not detected.

5. The distributed quantum relay architecture according to claim 1, wherein the architecture is compatible with entanglement swapping.

6. The distributed quantum relay architecture according to claim 1, wherein the initial state of the first photon pair at the first station can be set either directly, if the initial pair resource is unentangled, or by remote state preparation, if the initial photon pair is entangled.

7. The distributed quantum relay architecture according to claim 1, wherein the output of the first station sends said portion of the laser signal to said one of the relay stations before the output of the first station sends said second photon of the first pair of photons to said one of the relay stations.

8. The distributed quantum relay architecture according to claim 1, further comprising an optical fiber link or transparent optical network connecting the first station with said one of the relay stations, and wherein the output of the first station directs said second photon of the first pair of photons and said portion of the laser signal into said optical fiber with said defined relationship between said second photon of the first pair of photons and said portion of the laser signal.

9. The distributed quantum relay architecture according to claim 1, wherein:
the first photon pair source includes a laser for generating the laser signal, and a medium for using the laser signal to generate said first pair of entangled photons;
the first station further includes a demultiplexer for receiving said first pair of entangled photons, and for directing the first photon of said first pair of photons to the first state measurement device, and for directing the second photon of said first pair of photons to the output of said first station;
the output of the first station includes a multiplexer for receiving said second photon of the first pair of photons and said portion of the laser signal, and for directing the second photon of the first pair of photons and said portion of the laser signal to said one of the relay stations with said defined relationship between said second photon of the first pair of photons and said portion of the laser signal; and
the multiplexer receives said second photon of the first pair of photons a given length of time after the multiplexer receives said portion of the laser signal, and the multiplexer sends said second photon of the first pair of photons to said one of the relay stations said given length of time after the multiplexer sends said portion of the laser signal to said one of the relay stations.

10. The distributed quantum relay architecture according to claim 1, wherein:
the input of said one of the relay stations includes a switch having first and second outputs;
the switch receives the portion of the laser signal and the second photon of the first photon pair from said first station, and the switch directs said portion of the laser signal to the first output of the switch and directs the second photon of the first photon pair to the second output of the switch; and
said switch has a first switch state and a second switch state;
in said first switch state, the switch directs said portion of the laser signal to said first output of the switch; and
in the second switch state, the switch directs said second photon of the first photon pair to the second output of the switch; and said one of the relay stations further includes a switch controller for changing the switch between the first and second switch states.

11. The distributed quantum relay architecture according to claim 10, wherein:
the switch controller changes the switch from the first switch state to the second switch state after said portion of the laser signal is directed to the first output of the switch; and the switch returns to the first switch state a predetermined length of time after the switch controller changes the switch from the first switch state to the second switch state.

12. The distributed quantum relay architecture according to claim 1, wherein:
said one of the relay stations further includes a Bell State analyzer for measuring the combined state of the second photon of the first pair of photons and the first photon of the second pair of photons; and
said one of the relay stations introduces a time delay into said portion of the laser signal to synchronize transmission of the second photon of the first pair of photons and the first photon of the second pair of photons, to the Bell State analyzer of said one of the relay stations.

13. A method of operating a distributable quantum relay architecture, comprising:
at a first station, using a laser signal to generate a first pair of entangled photons;
using said first station to measure a state of a first photon of said first pair of photons, and to output a second photon of said first pair of photons and a portion of the laser signal, with a defined relationship between said second photon and said portion of the laser signal:
at a relay station, receiving said second photon and said portion of the laser signal, using said defined relationship to distinguish between said second photon and said portion of the laser signal, and using said portion of the laser signal to generate a second pair of entangled photons; and
using said relay station to measure the combined state of the second photon of the first pair of photons and a first photon of the second pair of photons, using said measure to control the state of a second photon of said second pair of photons and to direct said second photon of said second pair of photons to another relay station.

14. The method according to claim 13, wherein the first station outputs said portion of the laser signal before outputting said second photon of the first pair of photons; and the step of using said measure to control the state of the second photon of the second pair of photons includes using said measure to control the state of the second photon of the second pair of photons as prescribed in the quantum teleportation protocol.

15. The method according to claim 13, wherein an optical fiber link or transparent optical network connects the first station with said relay station, and the first station directs said second photon of the first pair of photons and said portion of the laser signal into said optical fiber link or transparent optical network with said defined relationship between said second photon of the first pair of photons and said second portion of the laser signal.

16. The method according to claim 13, wherein:
the first station includes a multiplexer for receiving said second photon of the first pair of photons and said portion of the laser signal, and for directing the second photon of the first pair of photons and said portion of the laser signal to said relay station; and
said defined relationship is a timed relationship between said second photon of the first pair of photons and said portion of the laser signal; and
the multiplexer receives said second photon of the first pair of photons a given length of time after the multiplexer receives said portion of the laser signal, and the multiplexer sends said second photon of the first pair of photons to said relay station said given length of time after the multiplexer sends said portion of the laser signal to said one of the relay stations.

17. A relay station in a distributed quantum relay architecture, wherein in said architecture, a laser signal is used to form a first pair of entangled photons, the relay station comprising:
- an input for receiving one photon of said first pair of entangled photons, and a portion of said laser signal, with a defined relationship between said one photon and said portion of the laser signal, and for using said defined relationship to distinguish between said one photon and said portion of the laser signal;
- a photon pair source for using said portion of the laser signal to generate a second pair of entangled photons;
- a Bell state measurement device for measuring the combined state of said one photon and a first photon of the second pair of photons;
- a state controlling device to adjust the state of a second photon of said second pair of photons based on results of said measuring; and
- an output for directing said second photon of said second pair of photons to another relay station in said distributed quantum relay architecture.

18. The relay station according to claim 17, wherein:
- the input includes a switch having first and second switch outputs;
- the switch receives the portion of the laser signal and the second photon of the first photon pair, and directs said portion of the laser signal to the first switch output and directs the second photon of the first photon pair to the second switch output;
- said switch has a first switch state and a second switch state;
- in said first switch state, the switch directs said second portion of the laser signal to said first output of the switch;
- in the second switch state, the switch directs said second photon of the first photon pair to the second output of the switch; and
- the relay station further includes a controller for changing the switch between the first and second switch states.

19. The relay station according to claim 18, wherein:
- the controller changes the switch from the first switch state to the second switch state after said portion of the laser signal is directed to the first output of the switch; and
- the switch returns to the first switch state a predetermined length of time after the controller changes the switch from the first switch state to the second switch state.

20. The relay station according to claim 17, wherein the relay station receives the portion of the laser signal before receiving said one of the photons, and wherein:
- the input of the relay station introduces a time delay into said portion of the laser signal to synchronize the transmission of the second photon of the first pair of photons and the first photon of the second pair of photons, to the Bell state measurement device.

* * * * *